United States Patent [19]
Takeda et al.

[11] Patent Number: 5,030,313
[45] Date of Patent: Jul. 9, 1991

[54] APPARATUS FOR CONNECTING STRIPS

[75] Inventors: Akimichi Takeda; Katsumi Morikawa; Seizo Koide, all of Amagasaki, Japan

[73] Assignee: Mitsubishi Denki Kabushiki Kaisha, Tokyo, Japan

[21] Appl. No.: 546,658

[22] Filed: Jun. 14, 1990

Related U.S. Application Data

[63] Continuation of Ser. No. 83,980, Aug. 11, 1987, abandoned.

[51] Int. Cl.$^5$ .................... B23K 11/04; B23K 37/047
[52] U.S. Cl. .................... 156/380.9; 156/159; 156/272.8; 156/304.5; 156/507; 219/78.15; 219/101; 219/105; 219/121.63; 228/5.1; 228/5.7
[58] Field of Search .................... 156/153, 159, 272.8, 156/304.1, 304.5, 304.6, 380.9, 502, 507, 510, 530; 228/170, 172, 5.1, 5.7; 219/78.14, 78.15, 101, 105, 121.63, 121.64

[56] References Cited

U.S. PATENT DOCUMENTS

| | | | |
|---|---|---|---|
| 3,394,857 | 7/1968 | Wheeler et al. | 228/5.7 |
| 3,400,030 | 9/1968 | Burger | 156/153 |
| 3,458,103 | 7/1969 | Davis | 228/5 |
| 3,729,360 | 4/1973 | McElroy | 156/153 |
| 3,773,598 | 11/1973 | Taeffner et al. | 156/159 |
| 4,765,532 | 8/1988 | Uomoti et al. | 228/5.7 |

FOREIGN PATENT DOCUMENTS

| | | |
|---|---|---|
| 2548375 | 5/1977 | Fed. Rep. of Germany . |
| 57-111485 | 7/1982 | Japan . |
| 57-171590 | 10/1982 | Japan . |
| 57-176178 | 11/1982 | Japan . |
| 58-38391 | 3/1983 | Japan . |
| 62-187584 | 8/1987 | Japan . |
| 464634 | 10/1968 | Sweden . |
| 1135318 | 12/1968 | United Kingdom . |

Primary Examiner—Michael G. Wityshyn
Attorney, Agent, or Firm—Burns, Doane, Swecker & Mathis

[57] ABSTRACT

An apparatus for connecting strips, in which a rear end portion of a preceding strip and a front end portion of a succeeding strip are cut and brought into contact to each other so that a butt welding of the contacted portions may be carried out to connect both the strips. A carriage is provided for carrying a cutting device for cutting the end portions of both the strips. A finish-machining device is provided for finish-machining the cut end faces of both the strips and a welding device for butt welding both the strips along a contacting line of both the strips is installed so as to be movable in a line substantially parallel with the contacting line of both the strips. Die wears and burrs incidental to cut faces can be prevented from forming and the highly accurate contacted state of strips can be achieved, thereby improving the quality of the welded portion.

1 Claim, 5 Drawing Sheets

APPARATUS FOR CONNECTING STRIPS

This application is a continuation of application Ser. No. 07/083,980, filed Aug. 11, 1987 now abandoned.

BACKGROUND OF THE INVENTION

1. Field of the Invention

The present invention relates to an apparatus for connecting strips in which a rear end of a preceding strip is connected to a front end of a succeeding strip by butt welding.

2. Description of The Prior Art

A conventional apparatus for connecting strips is disclosed in Japanese Patent Laid-Open No. 171590 (1982) is shown in FIGS. 1 to 4 herein in which FIG. 1 is a front view showing that apparatus;

FIG. 2 is a plan view showing the apparatus of FIG. 1;

FIG. 3 is a side view showing a sectioned state of the apparatus of FIG. 2; and

FIG. 4 is a side view showing a welded state of strips.

Referring now to FIG. 1, strips travel horizontally in a direction of from a front side to a back side as seen on the drawing through a transfer frame 2 which will be mentioned later. In addition, referring to FIG. 2, a travelling direction is seen in the up and down direction as seen on the drawing. Referring to FIGS. 3, 4, strips 6a, 6b travel in a direction shown by A in the drawing.

Referring again to FIG. 1, reference numeral 1 designates a base table having a width sufficiently longer than that of the strip and reference numeral 2 designates a transfer frame movable in a direction of a width of the base table 1 or the strip, and said transfer frame 2 being provided with a cutting device 25 and a welding device 16, which will be mentioned later, which are placed thereon. The base table 1 is provided with a groove 1a formed in a direction of width at a central portion in a travelling direction of the strip, the groove 1a being provided with a hydraulic cylinder 3 for moving the transfer frame 2 in a direction parallel thereto at a lower portion thereof, with a tube being fixed to the transfer frame 2 a rod of the cylinder 3 being fixed to the base table 1, the groove 1a is provided with a guide 4 mounted on a side thereof in a direction of width of the base table 1. A lower member of the transfer frame 2 is provided with a groove 2a formed on a bottom surface thereof extending all over the length thereof and a sliding face engaging the guide formed on a front face and a rear face thereof so that the lower member of the transfer frame 2 may be inserted into the groove 1a with the hydraulic cylinder 3 positioned within the groove 2a. Only that portion of the base table 1 in the vicinity of the groove 1a is shown in FIG. 1. Upon operating the hydraulic cylinder 3, the transfer frame 2 is transferred in the direction of width of the base table 1.

Referring again to FIG. 3, 6a, 6b designates a preceding strip and a succeeding strip, respectively, of a base table face 1b at a downstream side of the apparatus and a base table face 1c at an upstream side thereof. The groove 1a is located between the faces 1b, 1c and extends below the faces. The base table face 1b is provided with an outlet side clamping device 5 for clamping the preceding strip 6a. In addition, a tube of a hydraulic cylinder 9 is fixedly mounted on the base table face 1c. A rod of the hydraulic cylinder 9 is connected to a clamp-installing table 42 placed on the base table face 1c, said clamp-installing table 42 being provided with an inlet side clamping device 8 for clamping the succeeding strip 6b, installed in an opposite relation to the outlet side clamping device 5 with the groove 1a positioned between them. The outlet side clamping device 5 and the inlet side clamping device 8 comprise a hydraulic cylinder 7 and a hydraulic cylinder 10, respectively, as a driving source thereof and they are fixedly mounted on an upper fixing device (not shown). The clamping device 5, 8 clamps and releases the strip 6a, 6b by the action of the hydraulic cylinder 7, 10, respectively. In addition, the inlet side clamping device 8 can be transferred in the strip-travelling direction by the action of the hydraulic cylinder 9.

An upper member of the transfer frame 2 is provided with a hydraulic cylinder 21 fixedly mounted thereon with a tube on an upper side and a rod on a lower side, the rod being provided with a movable cutting edge device 20a mounted thereon. The hydraulic cylinder 21 is provided with guide rods 22a, 22b connected to the movable cutting edge device 20a standing on both sides in the direction of width of the base table 1, the guide rods 22a, 22b being engaged with guide rings provided on the upper member of the transfer frame 2 so as to vertically guide the transfer frame 2 up and down. The movable cutting edge device 20a is provided with two pieces of cutting edge with a suitable interval in the strip-travelling direction. The transfer frame 2 is provided with a hydraulic cylinder 23 fixedly mounted thereon with a tube on a lower side at a position opposite to the cylinder 21 of the lower member of the transfer frame 2 and connected to a fixed cutting edge device 20b with a rod on an upper side, the hydraulic cylinder 23 being provided with guide rods 24a, 24b standing on said fixed cutting edge device 20b on both sides in the direction of width of the base table 1, and the guide rods 24a, 24b being put in guide cylinders provided on the lower member of the transfer frame 2 side by side so as to vertically go up and down. The fixed cutting edge device 20b is provided with two pieces of cutting edge with a suitable interval in the strip-travelling direction. A cutting device 25 is composed of the movable cutting edge device 20a, the fixed cutting edge device 20b, the hydraulic cylinders 21, 23 and the guide members 22a, 22b, 24a, 24b. The fixed cutting edge device 20b is raised by the action of the hydraulic cylinder 23 until it is brought into contact with the strip and then the movable cutting edge device 20a is lowered by the action of the hydraulic cylinder 21 to cut the strip at two positions of the rear end of the preceding strip 6a and the front end of the succeeding strip 6b. The cutting device 25 can be transferred to the position, where the clamping device is installed, with the movement of the transfer frame 2.

The upper member of the transfer frame 2 is provided with a rectangular rail-holding plate 40 hanging down therefrom with a plate face thereof in the strip-travelling direction with a suitable distance in the direction of width from the portion where the hydraulic cylinder 21 is installed, the rail-holding plate 40 being provided with a rail 13 arranged horizontally in the direction of width of the strip, and the rail 13 being provided with a carriage 12 carrying a movable processing head 11 hanging down therefrom for emanating laser beams. The carriage 12 is provided with a motor 14 for driving the carriage 12 placed thereon. Laser beams emanated from a light source 41 enter the processing head 11 through a transmission system 15, where an optical path and an energy-density of the laser beams are changed by means of an optical system, and then are emanated downward from the processing head 11. The lower member of the transfer frame 2 is provided with a hydraulic cylinder 18 mounted thereon with a rod turned upward at a position below the rail-holding plate 40, the hydraulic cylinder 18 being provided with a welding back bar 17 connected thereto. The hydraulic cylinder 18 is provided with guide rods 19a, 19b hanging down from the welding back bar 17 on both sides in the direction of width of the base table 1, said guide rods 19a, 19b being put in guide cylinders installed on the lower member of the transfer frame 2 side by side so as to be capable of vertical up and down movement. The welding back bar 17 can be moved in an up and down direction by the action of the hydraulic cylinder 18. A welding device 16 is composed of the processing head 11, the carriage 12, the rail 13, the rail-holding plate 40, the motor 14, the welding back bar 17, the hydraulic cylinder 18 and the guide members 19a, 19b and can be transferred to a position, where the clamping device is installed, with the movement of the transfer frame 2.

In operation, when the rear end of the preceding strip 6a travelling in the direction of an arrow A in FIG. 3 arrives at an appointed position relative to the outlet side clamping device 5, the hydraulic cylinder 7 operates, thereby clamping the preceding strip 6a by means of the outlet side clamping device 5. Also the succeeding strip 6b travels in the same direction as the preceding strip 6a. Upon forming an appointed space between the rear end of the preceding strip 6a and the front end of the succeeding strip 6b, the hydraulic cylinder 10 operates, thereby clamping the succeeding strip 6b by means of the inlet side clamping device 8.

After both the strips 6a, 6b are clamped by means of both the clamping devices 5, 8, the transfer frame 2 is transferred by the operation of the hydraulic cylinder 3, thereby arranging the respective cutting edge devices, 20a, 20b between both the clamping devices 5, 8, as shown in FIG. 3. Under this condition, the fixed cutting edge device 20b is raised by the operation of the hydraulic cylinder 23 so as to be brought into contact with both the strips 6a, 6b. Subsequently, the movable cutting edge device 20a is lowered by the operation of the hydraulic cylinder 21 to cut the rear end of the preceding strip 6a and the front end of the succeeding strip 6b at the same time. Upon completion of the operation of the cutting device 25, the transfer frame 2 is transferred again by the operation of the hydraulic cylinder 3 to arrange the welding device 16 between both the clamping devices 5, 8, as shown in FIG. 4. The succeeding strip 6b is advanced by the operation of the hydraulic cylinder 9 under the condition that it is clamped by means of the inlet side clamping device 8 to bring the rear end of the preceding strip 6a into contact with the front end of the succeeding strip 6b. Upon completion of the operation of the inlet side clamping device 8, the welding back bar 17 is raised by the operation of the cylinder 18 so as to arrive at a position of contact with both the strips 6a, 6b. Subsequently, the carriage 12 is transferred by means of the motor 14 so that the processing head 11 may be located above the position, where both the strips 6a, 6b are brought into contact with each other, and laser beams are incident upon that position from the processing head 11 to weld both the strips 6a, 6b.

The area of the strips which is connected after being welded is dependent upon the shapes of contacting portions of both the strips. In general, a problem has occurred in that the contacting portions of plates cut by means of a cutting device provided with a fixed cutting edge and a movable cutting edge form a very small gap (B in FIG. 5) in the direction of thickness resulting from die wears, burrs and the like, as shown in FIG. 5, and it is difficult to secure the straightness of the end face, so that it is difficult to improve the connected portion in welding quality.

OBJECTS AND SUMMARY OF THE INVENTION

The present invention was achieved for solving the above described problem.

A first object of this invention is to provide an apparatus for connecting strips capable of forming a highly accurate contacting state and obtaining a welded portion of high quality without forming die wears, burrs and the like incidental to cut faces by finish-machining the cut faces of both strips cut by means of a cutting device, bringing the finished faces into contact with each other, and welding the contacted portion of the finished faces by a welding device.

A second object of this invention is to provide an apparatus for connecting strips capable of preventing the misregistration of welding from occurring in the welding process by carrying the cutting device, the finish-machining device and the welding device on the same one carriage travelling on a guide.

A third object of this invention is to provide an apparatus for connecting strips capable of achieving the finish-machining process in a short time by using a cutting machine as the finish-machining device.

A fourth object of this invention is to provide an apparatus for connecting strips capable of finishing the end faces to form flat surfaces by using a grinding attachment as the finish-machining device.

BRIEF DESCRIPTION OF THE DRAWING

The above and further objects and features of the invention will more fully be apparent from the following detailed description which should be considered in connection with the accompanying drawing, wherein.

DETAILED DESCRIPTION OF THE PREFERRED EMBODIMENTS

Figure 1:
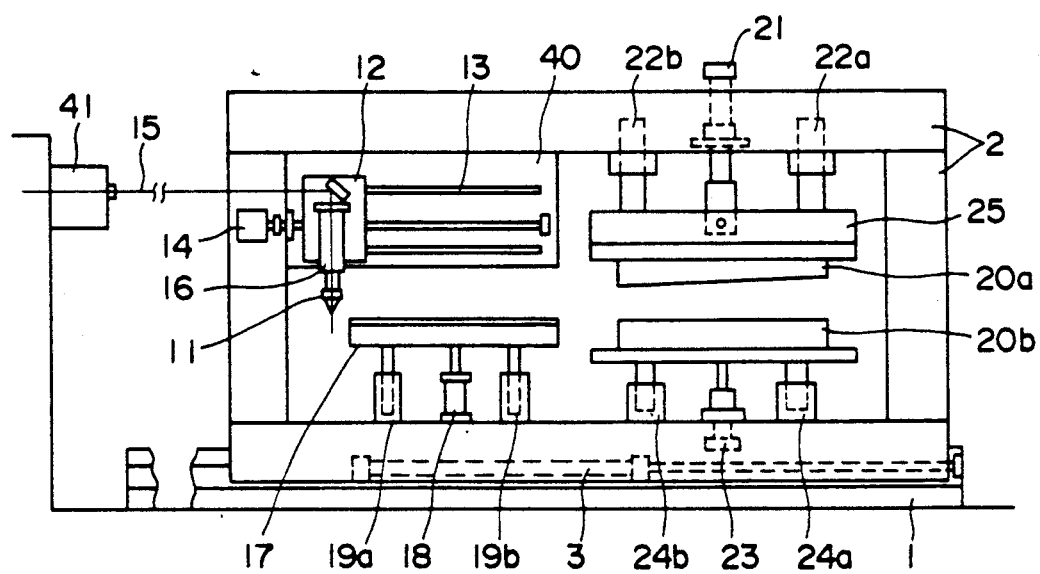
FIG. 1 is a front view showing the conventional apparatus for connecting strips.
Figure 2:
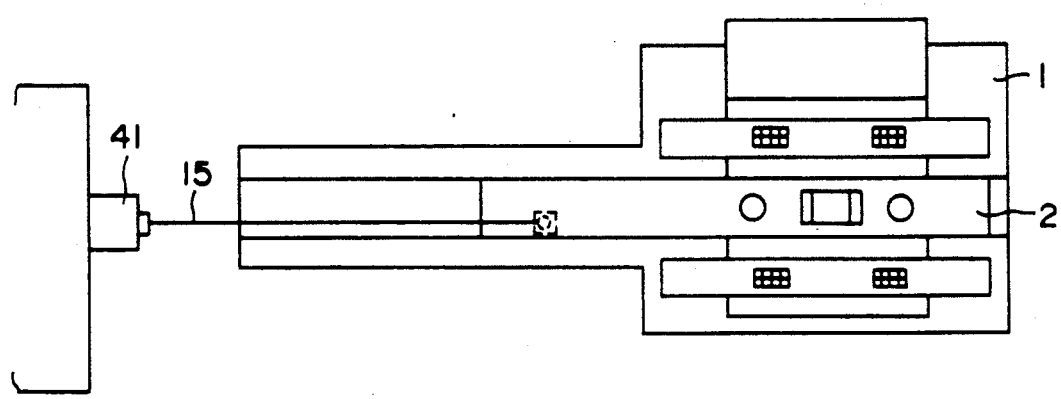
FIG. 2 is a plan view showing the conventional apparatus for connecting strips.
Figure 3:
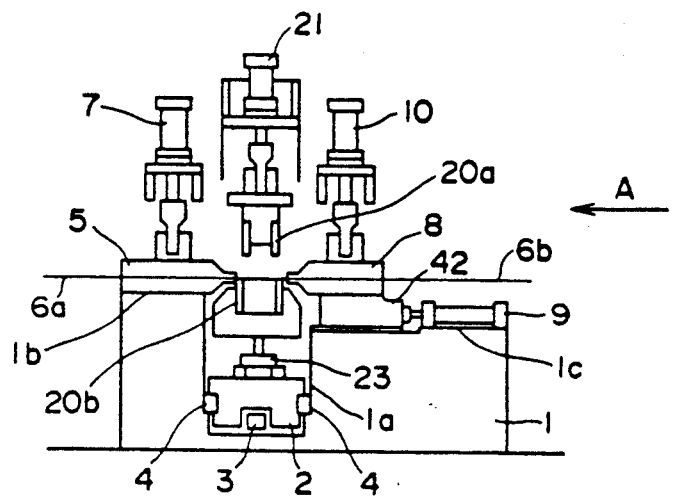
FIG. 3 is a side view showing a sectioned state of the conventional apparatus for connecting strips.
Figure 4:
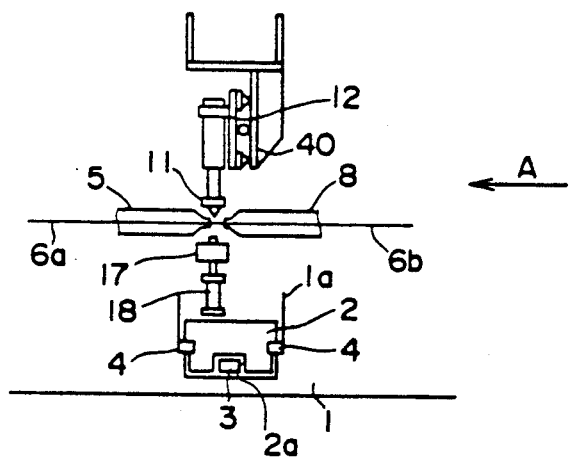
FIG. 4 is a side view showing a welded state of the conventional apparatus for connecting strips.
Figure 5:
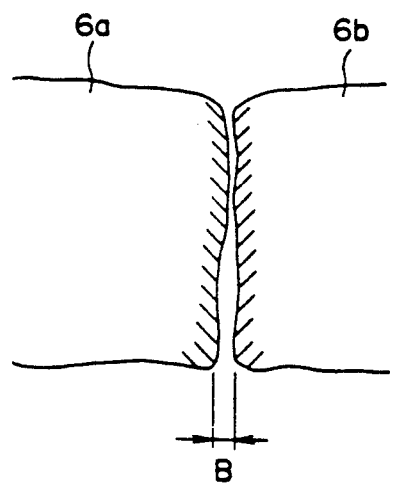
FIG. 5 is an enlarged view showing a contacted state of cut faces of strips.
Figure 6:
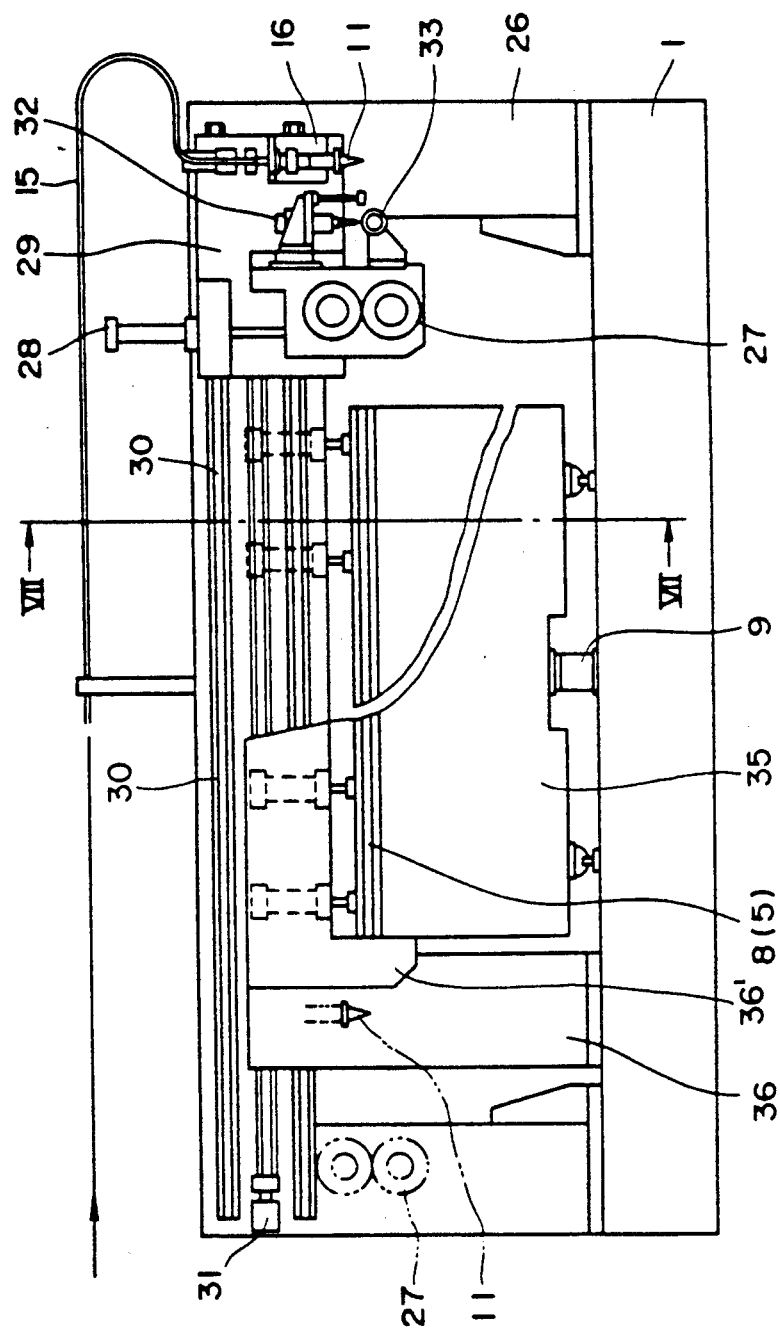
FIG. 6 is a front view showing an apparatus for connecting strips according to the preferred embodiment of the present invention.
Figure 7:
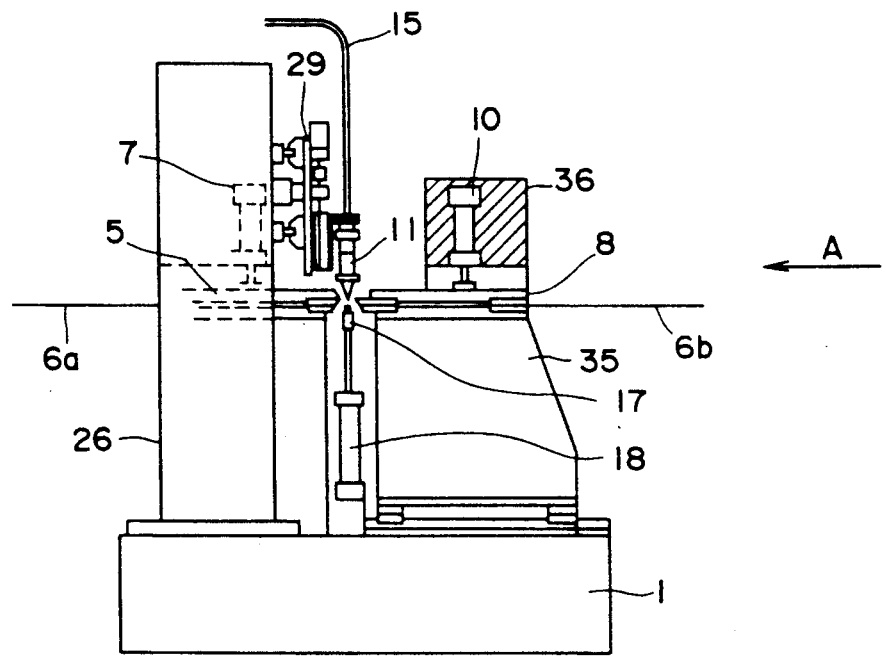
FIG. 7 is a side view showing a welded state of the strips as seen from a direction of VII—VII in FIG. 6.
Figure 8:
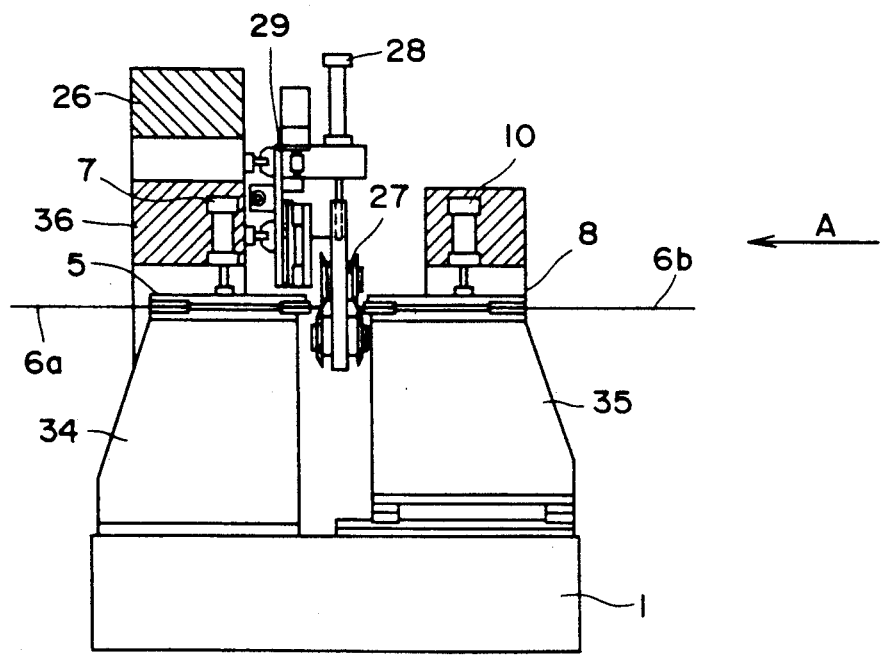
FIG. 8 is a side view taken partially in section showing a cut state of the strips.
Figure 9:
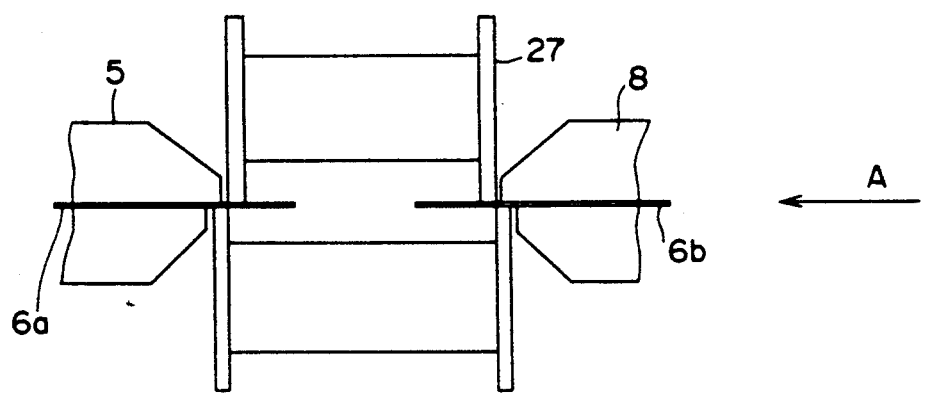
FIG. 9 is an enlarged side view showing a cut state of the strips.
Figure 10:
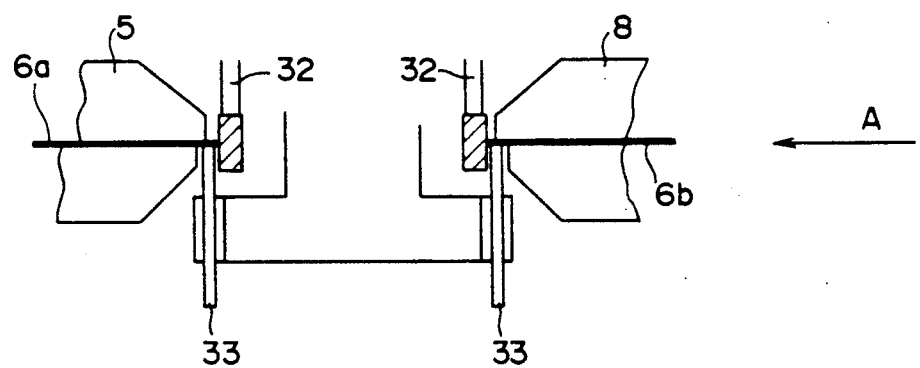
FIG. 10 is an enlarged side view showing a finish-machined state of the strips.
Figure 11:
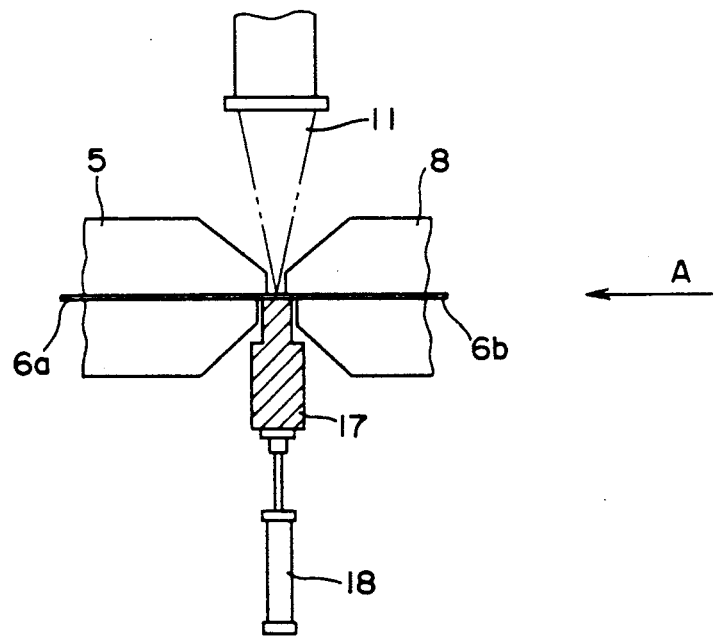
FIG. 11 is an enlarged side view showing a welded state of the strips.

The preferred embodiment of the present invention will be concretely described with reference to the drawing. Referring to FIG. 6 showing the preferred embodiment of the present invention, strips travel horizontally in a direction of a front side to a back side as seen in the figure. In addition, referring to FIGS. 7 to 11, strips 6a, 6b travel in the right and left direction (in the direction of A). The right side is an upstream side of the strip while the left side is a downstream side of the strip.

Referring to the drawing, reference numeral 1 designates a rectangular base table having a width sufficiently longer than that of the strip, the base table 1 being provided with a clamp-installing table 34 fixedly mounted on an upper surface thereof at a central portion in the direction of width in a downstream side of the travelling strip. In addition, the base table 1 is provided with a clamp-installing table 35 movable on the upper surface thereof in the direction of the travelling strip at in the upstream side thereof with a suitable distance from the clamp-installing table 34, the base table 1 being provided with a hydraulic cylinder 9 on the upper surface thereof with the tube of the cylinder being fixedly supported thereon and a rod of the cylinder being connected to the clamp-installing table 35. The clamp-installing table 34 is provided with an outlet side clamping device 5, the clamp-installing table 35 being provided with an inlet side clamping device 8, the outlet side clamping device 5 and inlet side clamping device 8 being provided with four hydraulic cylinders 7, 10 as driving sources in the direction of width, the hydraulic cylinders 7, 10 being mounted on an arched frames 36 and 36'; respectively surrounding the clamp-installing tables 34, 35. Both the clamping devices 5, 8 clamp and release the strips 6a, 6b by the operation of the hydraulic cylinders 7, 10.

The base table 1 is provided with a rectangular arched frame 26 having the same width as the base table 1 and a height larger than the clamp-installing table 34 fixedly standing on the upper surface thereof in the downstream side of the travelling strip, the frame 26 being provided with a guide rail 30 laid horizontally over nearly all of the surface in the direction of width of the base table 1 on a side surface of an upper member thereof at the upstream side. The guide rail 30 is provided with a carriage 29, carrying a rotary shears 27 as the cutting device, cutting machines 32, 33 as finish-machining devices for finish-machining the cut end faces of the strips by cutting, and a processing head 11 of a welding device 16 for welding both the strips, hanging down therefrom so as to be movable. The rotary shears 27 are carried on the carriage 29 through a hydraulic cylinder 28 so as to be movable in the up and down direction. The rotary shears 27 are provided with two sets of a pair of edges consisting of an upper edge and a lower edge contacted each other with a suitable distance in the direction of the strip travelling. The cutting machines 32, 33 are mounted on one side of the rotary shears 27 and consist of cutting tools. Two sets of cutting machines 32, 33 are installed with a suitable distance therebetween. The rotary shears 27 and the cutting machines 32, 33 are adjusted in height so as to operate at the same level. The rotary shears 27 cut the strips at two places, that is to say a rear end portion of a preceding strip 6a and a front end portion of a succeeding strip 6b, and the two sets of cutting machines 32, 33 cut the strips at the rear end portion of the preceding strip 6a and the front end portion of the strip 6b cut by means of the rotary shears 27. The welding device 16 is composed of a laser beam source (not shown), a transmission system 15 comprising optical fibers and the like connected to the laser beam source for transmitting laser beams and the processing head 11 connected to the transmission system for emanating laser beams. The laser beams emanated from the laser beam source enter the processing head 11 through the transmission system 15 where they are changed in optical path and energy-density by means of an optical system, and then they are emanated downward. The carriage 29 is carried on a motor 31 and travels on the guide rail 30 when driven by the driving motor 31, thereby transporting the rotary shears 27, the cutting machines 32, 33 and the welding device 16 in the direction of width of the strip.

A welding back bar 17 is installed below a gap between the clamping devices 5, 8 so as to be movable in the up and down direction by means of a hydraulic cylinder 18 mounted on the base table 1.

In operation, in an apparatus for connecting strips constructed in such a manner at first, as shown in FIG. 6, the carriage 29 carrying the rotary shears 27, the cutting machines 32, 33 and the welding device 16 holds itself in readiness at a position distant from the clamp-installing tables 34, 35. Under such a state, upon arrival of the rear end of the preceding strip 6a and the front end of the succeeding strip 6b at an appointed position relative to the outlet side clamping device 5 and the inlet side clamping device 8, respectively, both the strips 6a, 6b are clamped by the clamping device 5 and the clamping device 8 operated by the hydraulic cylinder 7 and the hydraulic cylinder 10 respectively.

Subsequently, the hydraulic cylinder 28 is operated to move the rotary shears 27 up and down so that the operating position of the edge of the rotary shears 27 may coincide with a travelling level of the strip. The carriage 29 travels toward the clamp-installing tables 34, 35 and is driven by the driving motor 31. Both strips 6a, 6b are cut at end portions thereof by means of the rotary shears 27 (refer to FIGS. 8, 9). Then, the carriage 29 travels in an opposite direction to cut the end portions of both the strips 6a, 6b at end portions thereof by means of the cutting machines 32, 33, thereby carrying out the finish-machining of the end faces of the strips 6a, 6b (refer to FIG. 10). Upon completion of the above described operation, the carriage 29 further travels in the above described direction to take shelter in a position distant from the clamp-installing devices 34, 35 (right side in FIG. 6).

Subsequently, the hydraulic cylinder 9 is operated to move the succeeding strip 6b toward the preceding strip 6a, thereby bringing the rear end of the preceding strip 6a into contact with the front end of the succeeding strip 6b. Under such a condition, the welding back bar 17 is raised by the operation of the hydraulic cylinder 18 so as to be brought into contact with the strips 6a, 6b. Then, the carriage 29 travels in a direction toward its original position (rightward in FIG. 6) to weld both the strips 6a, 6b by laser beams emanated from the welding device 16 (the processing head 11) (refer to FIG. 11).

According to the present invention, since the cut faces of both strips are cut by means of a cutting tool and then the cut portions are welded, a welded portion of high quality can be obtained.

In addition, since the rotary shears, the cutting tool and the processing head are carried on the same one carriage, misregistration of welding does not occur.

Although in the present preferred embodiment a cutting tool is used as the cutting machine, other cutting machines may be used. In addition, although in the present preferred embodiment, the cut faces of the strips are cut by means of the cutting machine, as described, the cut faces of the strips may alternatively be ground by a grinding attachment.

Furthermore, although in the present preferred embodiment the welding is carried out by the use of laser beams, other high energy beams, such as electron beams, may be used.

As this invention may be embodied in several forms without departing from the spirit of the essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An apparatus for connecting two strips of material comprising:
   a rotary shears comprising two assemblies, each assembly including a pair of rotating blades, both of said assemblies being mounted on a common frame, for cutting the two strips of material to form a first strip portion having a rear end and a second strip portion having a front end;
   a cutting machine for finish-machining the front and rear ends;
   means for bringing the front and rear ends into contact with each other along a line of contact by holding one of the strips stationary in a reference position and moving the other strip into an abutting relation with the held strip;
   a laser beam welder for butt welding the front and rear ends together along the line of contact; and
   a carriage including a guide rail, said carriage supporting the rotary shears, cutting machine, and laser beam welder on said guide rail for movement in the direction of the line of contact relative to the strips to permit cutting, finish-machining, and welding to be carried out on the strips as the carriage moves in the direction of the line of contact.

* * * * *